United States Patent
Gomez et al.

(10) Patent No.: US 8,746,554 B2
(45) Date of Patent: *Jun. 10, 2014

(54) PERFORMING SOCIAL NETWORKING FUNCTIONS USING MATRIX CODES

(71) Applicant: EchoStar Technologies L.L.C., Englewood, CO (US)

(72) Inventors: Mark H. Gomez, Parker, CO (US); Jason Anguiano, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,480

(22) Filed: Nov. 9, 2012

(65) Prior Publication Data

US 2013/0068838 A1    Mar. 21, 2013

Related U.S. Application Data

(63) Continuation of application No. PCT/US2011/064709, filed on Dec. 13, 2011, which is a continuation of application No. 12/986,721, filed on Jan. 7, 2011, now Pat. No. 8,292,166.

(51) Int. Cl.
*G06K 5/00* (2006.01)

(52) U.S. Cl.
USPC .................................. 235/380; 235/383

(58) Field of Classification Search
USPC .............. 235/380, 383, 454, 462.1, 462.45
See application file for complete search history.

(56) References Cited

U.S. PATENT DOCUMENTS

| | | | |
|---|---|---|---|
| 4,809,325 A | 2/1989 | Hayashi et al. |
| 4,837,414 A | 6/1989 | Edamula |
| 5,510,603 A | 4/1996 | Hess et al. |
| 5,581,636 A | 12/1996 | Skinger |

(Continued)

FOREIGN PATENT DOCUMENTS

| CN | 1571503 A | 1/2005 |
|---|---|---|
| CN | 101 227 581 A | 7/2008 |

(Continued)

OTHER PUBLICATIONS

U.S. Appl. No. 12/961,369, filed Dec. 6, 2010, Final Rejection mailed Oct. 30, 2012, 17 pages.

(Continued)

*Primary Examiner* — Daniel St Cyr
(74) *Attorney, Agent, or Firm* — Kilpatrick Townsend & Stockton LLP (57) ABSTRACT

A matrix code reader may detect a matrix code (such as a QR code), which may be displayed along with content and include information identifying the content. The matrix code reader may obtain user information associated with a social networking service and, based at least on the content information and the user information, may transmit an instruction to the social networking service to perform a social networking service function. The matrix code reader may obtain the user information and/or the instruction to perform the social networking service function from information included in the matrix code, from a non-transitory storage medium of the matrix code reader, from a user, and so on. In some implementations, the matrix code reader may determine that additional information or a confirmation to transmit the instructions is needed and may prompt a user for the additional information or confirmation.

20 Claims, 6 Drawing Sheets

(56) References Cited

U.S. PATENT DOCUMENTS

| | | |
|---|---|---|
| 5,602,377 A | 2/1997 | Beller et al. |
| 5,703,349 A | 12/1997 | Meyerson et al. |
| 5,959,285 A | 9/1999 | Schuessler |
| 5,978,855 A | 11/1999 | Metz et al. |
| 6,006,990 A | 12/1999 | Ye et al. |
| 6,058,238 A | 5/2000 | Ng |
| 6,512,919 B2 | 1/2003 | Ogasawara |
| 6,556,273 B1 | 4/2003 | Wheeler et al. |
| 6,983,304 B2 | 1/2006 | Sato |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 2001/0037297 A1 | 11/2001 | McNair |
| 2001/0052133 A1 | 12/2001 | Pack et al. |
| 2002/0027612 A1 | 3/2002 | Brill et al. |
| 2002/0049980 A1 | 4/2002 | Hoang |
| 2002/0112250 A1 | 8/2002 | Koplar et al. |
| 2003/0018711 A1 | 1/2003 | Imanishi |
| 2003/0050854 A1 | 3/2003 | Showghi et al. |
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2005/0011958 A1 | 1/2005 | Fukasawa et al. |
| 2005/0015800 A1 | 1/2005 | Holcomb |
| 2005/0055281 A1 | 3/2005 | Williams |
| 2005/0059339 A1 | 3/2005 | Honda et al. |
| 2005/0125301 A1 | 6/2005 | Muni |
| 2005/0149967 A1 | 7/2005 | Hanley et al. |
| 2005/0180804 A1 | 8/2005 | Andrew et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0095286 A1 | 5/2006 | Kimura |
| 2006/0124742 A1 | 6/2006 | Rines et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0206020 A1 | 9/2007 | Duffield et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0267537 A1 | 10/2008 | Thuries |
| 2008/0281624 A1 | 11/2008 | Shibata |
| 2009/0029725 A1 | 1/2009 | Kindberg |
| 2009/0031071 A1 | 1/2009 | Chiu |
| 2009/0031373 A1 | 1/2009 | Hogyoku |
| 2009/0083808 A1 | 3/2009 | Morrison |
| 2009/0088213 A1 | 4/2009 | Rofougaran |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li et al. |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0307232 A1 | 12/2009 | Hall |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0327060 A1 | 12/2010 | Moran et al. |
| 2011/0030068 A1 | 2/2011 | Imai |
| 2011/0039573 A1 | 2/2011 | Hardie |
| 2011/0065451 A1 | 3/2011 | Danado et al. |
| 2011/0087539 A1 | 4/2011 | Rubinstein et al. |
| 2011/0107386 A1 | 5/2011 | De Los Reyes et al. |
| 2011/0208710 A1* | 8/2011 | Lesavich .................. 707/706 |
| 2011/0258058 A1 | 10/2011 | Carroll et al. |
| 2011/0264527 A1* | 10/2011 | Fitzpatrick et al. ........ 705/14.55 |
| 2011/0264530 A1 | 10/2011 | Santangelo et al. |
| 2011/0282727 A1* | 11/2011 | Phan et al. ................. 705/14.36 |

(56) References Cited

U.S. PATENT DOCUMENTS

| | | |
|---|---|---|
| 2011/0314485 A1 | 12/2011 | Abed |
| 2012/0096499 A1 | 4/2012 | Dasher et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1 | 6/2012 | Gerhards et al. |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0206648 A1 | 8/2012 | Casagrande et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008-244556 A | 10/2008 |
| KR | 2004 0087776 A | 10/2004 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 2005/109338 A1 | 11/2005 |
| WO | 2007/009005 A1 | 1/2007 |
| WO | 2009/057651 A1 | 5/2009 |
| WO | 2009/144536 A1 | 12/2009 |
| WO | 2010/149161 A1 | 12/2010 |
| WO | 2011/009055 A2 | 1/2011 |
| WO | 01/58146 A2 | 8/2011 |

OTHER PUBLICATIONS

U.S. Appl. No. 12/971,349, filed Dec. 7, 2010, Final Rejection mailed Oct. 24, 2012, 11 pages.

U.S. Appl. No. 12/953,227, filed Nov. 23, 2010, Office Action mailed Nov. 7, 2012, 31 pages.

U.S. Appl. No. 13/015,382, filed Jan. 27, 2011, Office Action Mailed Nov. 13, 2012, 7 pages.

U.S. Appl. No. 13/016,483, filed Jan. 28, 2011 Office Action mailed Nov. 2, 2012, 18 pages.

U.S. Appl. No. 12/953,273, filed Nov. 23, 2010, Notice of Allowance mailed Oct. 18, 2012, 11 pages.

U.S. Appl. No. 13/034,482, filed Feb. 24, 2011, Office Action mailed Oct. 19, 2012, 11 pages.

U.S. Appl. No. 13/035,474, filed Feb. 25, 2011, Office Action mailed Oct. 30, 2012, 11 pages.

"Android App Reviews & Showcase Just a Tapp Away," Android Tapp, 10pp. Found online at http://www.androidtapp.com/download-the-weather-channel-android-app-from-your-tv/, Oct. 22, 2010.

"Can Mobile Barcodes Work on TV?," India and Asia Pacific Mobile Industry Reports, Sep. 2009, 4 pp. Found online at http://gomonews.com/can-mobile-barcodes-work-on-tv/, Oct. 22, 2010.

"FOX TV Uses QR Codes," 2D Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2D Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local—QR Barcode Technology, 2 pp. Found online at http://www.searchmagnetlocal.com/qr_barcode_technology.html, Oct. 22, 2010.

Byford, D., "Universal Interactive Device," International Business Machines Corporation, Jun. 1998, 1 page.

Costedio, K., "Bluefly QR Codes Debut on TV," 2 pp. Found online at http://www.barcode.com/Mobile-Barcode-news/bluefly-qr-codes-debut-on-tv.html, Oct. 22, 2010.

Extended European Search Report for EP 12152690.9 dated Jun. 19, 2012, 9 pages.

Gao, J., et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

International Search Report and Written Opinion of PCT/US11/59977 mailed on Mar. 19, 2012, 7 pages.

International Search Report and Written Opinion of PCT/US11/60002 mailed on Feb. 15, 2012, 7 pages.

International Search Report and Written Opinion of PCT/US11/60094 mailed on Mar. 30, 2012, 7 pages.

International Search Report and Written Opinion of PCT/US11/60104 mailed on Mar. 29, 2012, 9 pages.

International Search Report and Written Opinion of PCT/US11/60121 mailed on Feb. 14, 2012, 7 pages.

International Search Report and Written Opinion of PCT/US11/61074 mailed on Jan. 6, 2012, 11 pages.

International Search Report and Written Opinion of PCT/US11/61211 mailed on Mar. 29, 2012, 8 pages.

International Search Report and Written Opinion of PCT/US11/61773 mailed on Feb. 21, 2012, 7 pages.

International Search Report and Written Opinion of PCT/US11/61778 mailed on Mar. 2, 2012, 7 pages.

International Search Report and Written Opinion of PCT/US11/63111 mailed on Apr. 4, 2012, 9 pages.

(56) References Cited

OTHER PUBLICATIONS

International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068161 mailed on Jun. 14, 2012, 19 pages.
International Search Report and Written Opinion of PCT/US2011/068176 mailed on Mar. 29, 2012, 15 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026624 mailed Aug. 29, 2012, 14 pages.
International Search Report and Written Opinion of PCT/US2012/026722 mailed Jun. 28, 2012, 11 pages.
International Search Report of PCT/US11/60109 mailed on Feb. 14, 2012, 3 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
Olson, E., "Bar Codes add Detail on Items in TV Ads," New York Times, Sep. 2010, 3 pp. Found online at http:www.nytimes.com/2010/09/27/business/media/27bluefly.html?src=busin, Oct. 22, 2010.
Rekimoto, J., et al., "Augment-able Reality: Situated Communication Through Physical and Digital Spaces," Sony Computer Science Laboratory, 2002, 8 pp. Found online at Citeseer: 10.1.1.20.34[1].pdf, Oct. 22, 2010.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Silverstein, B., "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Smith, L., "QR Barcodes Make History on Global TV," 3 pp. Found online at http://lindsaysmith.com/worlds-first-mobio-mini-telethon/, Oct. 22, 2010.
Yamanari, T., et al., "Electronic Invisible Code Display Unit for Group Work on Reminiscence Therapy," Proceedings of the International MultiConference of Engineers and Computer Scientists 2009, vol. 1, IMECS 2009, Mar. 2009, 6 pp. Retrieved from the Internet: http://citeseerx.ist.psu.edu/viewdoc/download?doi=10.1.1.145.6904&rep1&type=pdf.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Office Action mailed Mar. 16, 2012, 6 pages.
U.S. Appl. No. 12/986,721, filed Jan. 7. 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
U.S. Appl. No. 13/037,312, filed Feb. 28, 2011, Office Action mailed Aug. 15, 2012, 9 pages.
U.S. Appl. No. 12/964,478, filed Dec. 9, 2010, Non-Final Office Action mailed Mar. 26, 2013, 19 pages.
U.S. Appl. No. 12/961,369, filed Dec. 6, 2010, Non-Final Office Action mailed Mar. 25, 2013, 17 pages.
U.S. Appl. No. 12/953,227, filed Nov. 23, 2010, Final Office Action mailed May 24, 2013, 17 pages.
U.S. Appl. No. 12/973,431, filed Dec. 20, 2010, Non-Final Rejection mailed May 15, 2013, 30 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
International Search Report of PCT/US2012/022581 mailed on Oct. 8, 2012, 18 pages.
International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed Dec. 29, 2010, Office Action mailed Dec. 21, 2012, 23 pages.
U.S. Appl. No. 12/984,385, filed Jan. 4, 2011, Notice of Allowance mailed Nov. 28, 2012, 11 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/028,030, filed Feb. 15, 2011, Office Action mailed Jan. 11, 2013, 14 pages.
U.S. Appl. No. 12/960,285, filed Dec. 3, 2010, Non-Final Office Action mailed Dec. 6, 2012, 17 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.

(56) References Cited

OTHER PUBLICATIONS

U.S. Appl. No. 13/037,333, filed Feb. 28, 2011 Notice of Allowance mailed Jan. 18, 2013, 27 pages.
Liu, Yue et al., "Recognition of QR code with mobile phones," Control and Decision Conference, 2008. CCDC 2008. Jul. 2-4, 2008, pp. 203, 206.
U.S. Appl. No. 12/964,478, filed Dec. 9, 2010, Final Office Action mailed Sep. 16, 2013, 12 pages.
U.S. Appl. No. 12/981,244, filed Dec. 29, 2010, Final Office Action mailed Oct. 30, 2013, 10 pages.
U.S. Appl. No. 12/973,431, filed Dec. 20, 2010, Final Office Action mailed Aug. 27, 2013, 11 pages.
U.S. Appl. No. 13/006,270, filed Jan. 13, 2011, Non-Final Office Action mailed Oct. 8, 2013, 20 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011 Final Office Action mailed Oct. 16, 2013, 28 pages.
U.S. Appl. No. 13/037,316, filed Feb. 28, 2011, Final Office Action mailed Aug. 28, 2013, 13 pages.

* cited by examiner

PERFORMING SOCIAL NETWORKING FUNCTIONS USING MATRIX CODES

CROSS-REFERENCES TO RELATED APPLICATIONS

This application is a continuation of PCT Application No. PCT/US2011/064709, filed Dec. 13, 2011, entitled "PERFORMING SOCIAL NETWORKING FUNCTIONS USING MATRIX CODES," which is a continuation of U.S. patent application Ser. No. 12/986,721, filed Jan. 7, 2011, now U.S. Pat. No. 8,292,166, entitled "PERFORMING SOCIAL NETWORKING FUNCTIONS USING MATRIX CODES".

FIELD OF THE INVENTION

This disclosure relates generally to social networking, and more specifically to performing social network functions in response to detected matrix codes.

SUMMARY

The present disclosure discloses systems and methods for performing social networking service functions utilizing matrix codes. A matrix code reader may detect a matrix code, which may be displayed along with an instance of content and include information identifying the instance of content. The matrix code reader may obtain user information associated with a social networking service and, based at least on the information identifying the instance of content and the user information, the matrix code reader may transmit an instruction to the social networking service to perform a social networking service function. The social networking function that the social networking service is instructed to perform may be any kind of function supported by the social networking service such as posting one or more status updates regarding the instance of content, posting one or more comments regarding the instance of content, scheduling one or more events associated with the instance of content, posting at least one review of the at least one instance of content, submitting a request to join a group associated with the at least one instance of content, and so on.

The matrix code reader may obtain the user information and/or the instruction to perform the social networking service function from information included in the matrix code, from a non-transitory storage medium of the matrix code reader, from a user, and so on. If the matrix code reader obtains the user information and/or the instruction to perform the social networking service function from information included in the matrix code or the non-transitory storage medium, the matrix code reader may determine that additional information is needed. In such cases, the processing unit may prompt a user for the additional information and receive such additional information in response to the prompt. Even in situations where the matrix code reader does not determine that additional information is required, the matrix code reader may prompt a user before transmitting the instruction to the social networking service in order to confirm that the user desires the instruction to be transmitted.

In one or more implementations, the social networking service may be an independent service provider entity such as Facebook™, MySpace™, Twitter™, and so on. In other implementations, the social networking service may be software and/or hardware tools that are not part of an independent service provider entity which users set up to function as social networking services such as calendaring programs, mass email or text message lists, and so on.

In some implementations, information indicating that and instruction to perform one or more social networking service functions may be included in the matrix code and the matrix code reader may determine to transmit the instruction based on such information. However, in other implementations, the matrix code may not include any user information and the matrix code reader may be configured to select an instruction to perform a social networking function related to a captured matrix code anytime a captured matrix code includes information identifying an instance of content. Such selection may be performed by consulting defaults or user preferences stored in a non-transitory storage medium of the matrix code reader, by prompting a user, and so on.

In various implementations, the instance of content may be provided to a display device by an electronic device such as a set top box, a digital video recorder, a television tuner, a content receiver, a digital video disk player, a movie theater projection system, a home computer, and so on. The instance of content that is provided may be stored in the non-transitory storage medium, received from a content source, and so on. In some instances, the instance of content may already include the matrix code when received by the electronic device. In other instances, however, the electronic device may generate the matrix code, modify the matrix code, add the matrix code to the instance of content, and so on. In implementations where the electronic device generates or modifies the matrix code, the electronic device may obtain the information identifying the content, the user information, information regarding the instruction to perform the social networking function, and so on and may include such information in the matrix code before adding the matrix code to the instance of content.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Social networking services, whether independent service provider entities (such as Facebook™, MySpace™, Twitter™, and so on) or tools that are not part of an independent service provider entity which users set up to function as social networking services (such as calendaring programs, mass email or text message lists, and so on), are increasingly becoming an integral part of how people interact with each other in the modern world. Users utilize such social networking services to maintain contact with other users, inform other users of their thoughts and events in their lives, inform themselves of the thoughts and life events of other users, and so on. Users even utilize social networking services to communicate with other users regarding their viewing of content (such as movies, television programs, and so on) which may not even be related to the social networking service which is utilized. They may communicate to others that they are viewing the content, indicate their thoughts regarding the content, determine who else has viewed the content, schedule events related to the content, and so on.

However, it may be inconvenient and burdensome for users to utilize social networking services to communicate with other social networking service users regarding their viewing of content while they are viewing such content. Frequently, users must enter information regarding the social networking service (such as information to access the social networking service, log in information, indications of which functions they wish to utilize, and so on) into a device (such as a computing device) other than the device they are utilizing to view the content (such as a television, a movie theater screen, and so on). The amount of information a user is required to enter in order to utilize the social networking service may discourage the user from utilizing the social networking service he otherwise desires to utilize. Further, such social networking service utilization may distract the user from the user's primary purpose of viewing the content.

The present disclosure discloses systems and methods for performing social networking service functions utilizing matrix codes. A user may utilize a matrix code reader device to detect one or more matrix codes. The matrix code may be displayed along with one or more instances of content that a user is viewing and include information identifying the instance of content. The matrix code reader device may obtain user information for the user that is associated with one or more social networking services. Then, based at least on the information identifying the instance of content and the user information, the matrix code reader device may transmit one or more instructions to the social networking service to perform one or more social networking service functions. Hence, users may be able to direct the performance of social networking service functions related to content they are viewing without having to enter as much information and without having to distract themselves from the content as much as they otherwise would have. Thus, it may be more convenient and less burdensome for users to utilize social networking service functions related to content that they are viewing.

Figure 1:
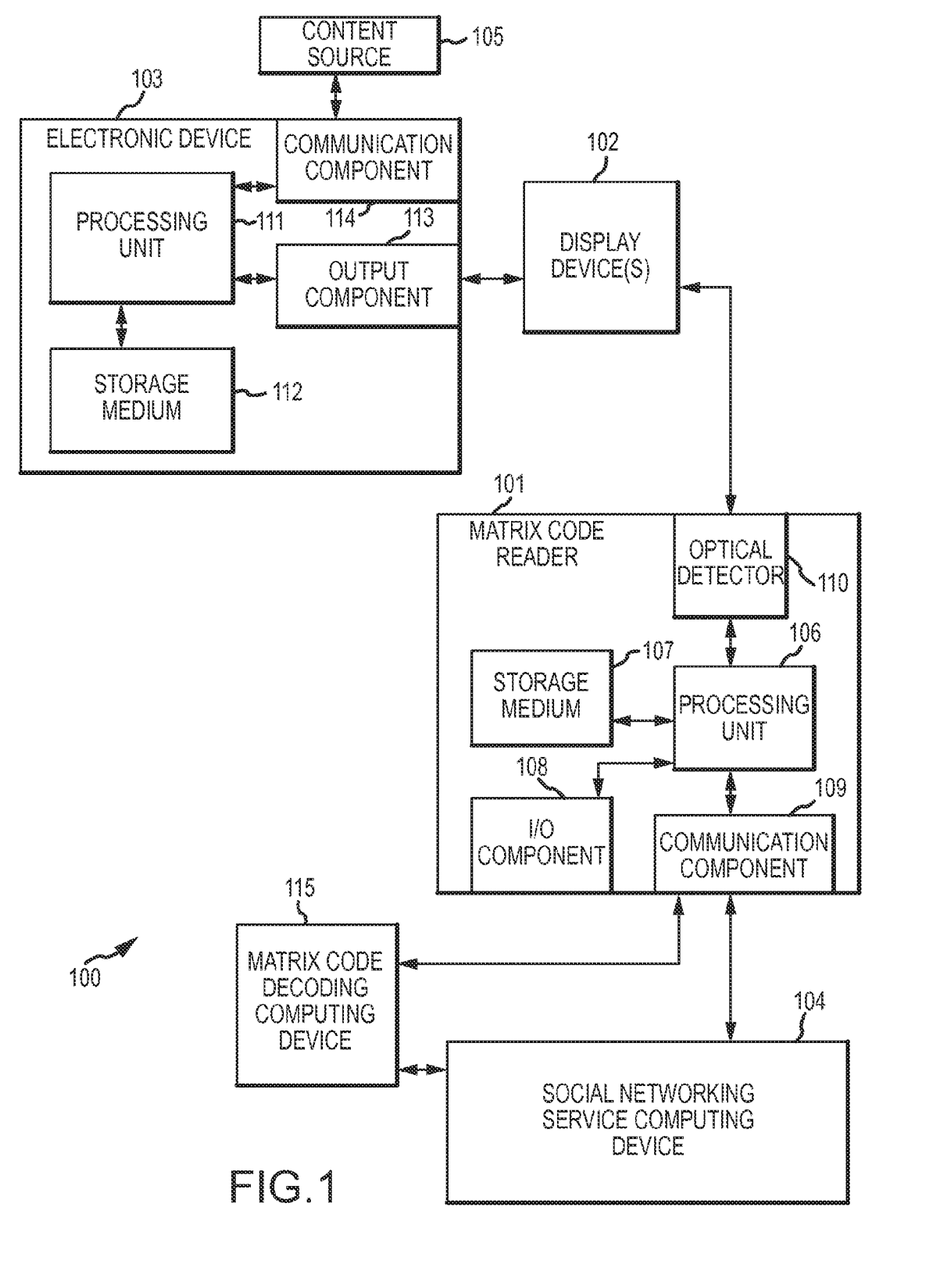
FIG. 1 is a block diagram illustrating a system for performing social networking service functions utilizing matrix codes.

FIG. 1 is a block diagram illustrating a system 100 for performing social networking service functions utilizing matrix codes. The system 100 includes one or more matrix code readers 101, one or more display devices 102, and one or more social networking service computing devices 104. The matrix code reader may be any kind of electronic device capable of detecting (or capturing) matrix codes (such as QR codes) such as a cellular phone, a smart phone, a tablet computer, a mobile computer, a personal digital assistant, and so on. The display device may be any kind of display device such as a movie theater screen, a television, a computer monitor, a cathode ray tube display, a liquid crystal display, and so on.

The display device 102 may display one or more instances of content. The instance of content may be content such as a television program, a movie, a commercial, an instructional video, and so on. The instance of content may also include one or more matrix codes (such as QR codes) which may include information identifying the instance of content (such as a title, program identifier, description, and so on).

The matrix code reader 101 may include one or more processing units 106, one or more non-transitory storage media 107 (which may take the form of, but is not limited to, a magnetic storage medium; optical storage medium; magneto-optical storage medium; read only memory; random access memory; erasable programmable memory; flash memory; and so on), one or more input/output components 108 (such as keyboards, mice, touch screens, touch pads, displays, virtual keyboards, microphones, and so on), one or more communication components 109, and one or more optical detectors 110 (such as still image cameras, video cameras, barcode readers, and so on). The processing unit may execute instructions stored in the non-transitory storage medium to detect the matrix code displayed by the display device 102. The processing unit may also execute instructions stored in the non-transitory storage medium to obtain user information associated with the social networking service associated with the social networking service computing device 104 and transmit one or more instructions to the social networking service computing device via the communication component 109 to perform one or more social network service functions based at least on the information identifying the instance of content and the user information.

The social networking function that the processing unit 106 instructs the social networking service computing device 104 to perform may be any kind of function supported by the social networking service associated with the social networking service computing device. For example, the function may include posting one or more status updates regarding the instance of content (such as a status update indicating that the user is currently watching the content), posting one or more comments regarding the instance of content (such as a comment asking whether other users are watching the instance of content), scheduling one or more events associated with the instance of content (such as scheduling a party for other users to attend after the instance of content finishes), posting at least one review of the at least one instance of content (such as an in-depth review of the instance content, an indicating that the user likes the instance of content, and so on), submitting a request to join a group associated with the at least one instance of content (such as a request to join a fan group for the instance of content, requesting to join an email list for updates related to the instance of content, and so on), and so on.

In some instances, the processing unit 106 may obtain the user information and/or the instruction to perform the social networking service function from information included in the matrix code. In other instances, the matrix code may not include the user information and/or the instruction to perform the social networking service function and the processing unit may obtain the user information and/or the instruction to perform the social networking service function from information stored in the non-transitory storage medium 107, such as information stored in one or more default settings files, information previously received from a user via the input/output component 108 and stored in one or more user preference files stored in the non-transitory storage medium, and so on. In still other instances, the processing unit may obtain the user information and/or the instruction to perform the social networking service function by prompting a user for such information and receiving such information from a user via the input/output component.

In various instances where the processing unit 106 obtains the user information and/or the instruction to perform the social networking service function from information included in the matrix code or the non-transitory storage medium 107, the processing unit may determine that additional information is needed in order to transmit the instruction to the social networking service computing device 104. In such cases, the processing unit may prompt a user for the additional information and receive such additional information in response to the prompt via the input/output component 108. For example, the user information may specify a network address for the social networking service computing device and to post a comment regarding the instance of content, but may not include the comment itself. As such, the processing unit may prompt a user for a comment regarding the instance of content and may transmit an instruction to post the comment after the comment is received from the prompted user.

Even in situations where the processing unit 106 obtains the user information and/or the instruction to perform the social networking service function from information included in the matrix code or the non-transitory storage medium 107 and does not determine that additional information is required, the processing unit may prompt a user via the input/output components 108 before transmitting the instruction to the social networking service computing device 104. For example, the user information may specify a network address for the social networking service computing device and to post a status update that a user is watching the instance of content, but the processing unit may prompt the user to confirm that he wishes the status update to be posted. The processing unit may then transmit the instruction to post the status update when the confirmation is received from the prompted user.

In some implementations, information indicating that and instruction to perform one or more social networking service functions may be included in the matrix code and the matrix code reader 101 may determine to transmit the instruction based on such information. However, in other implementations, the matrix code may not include any user information and the matrix code reader may be configured to select an instruction to perform a social networking function related to a captured matrix code anytime a captured matrix code includes information identifying an instance of content. Such selection may be performed by consulting defaults or user preferences stored in the non-transitory storage medium 107, by prompting a user via the input/output components 108, and so on.

Figure 2:
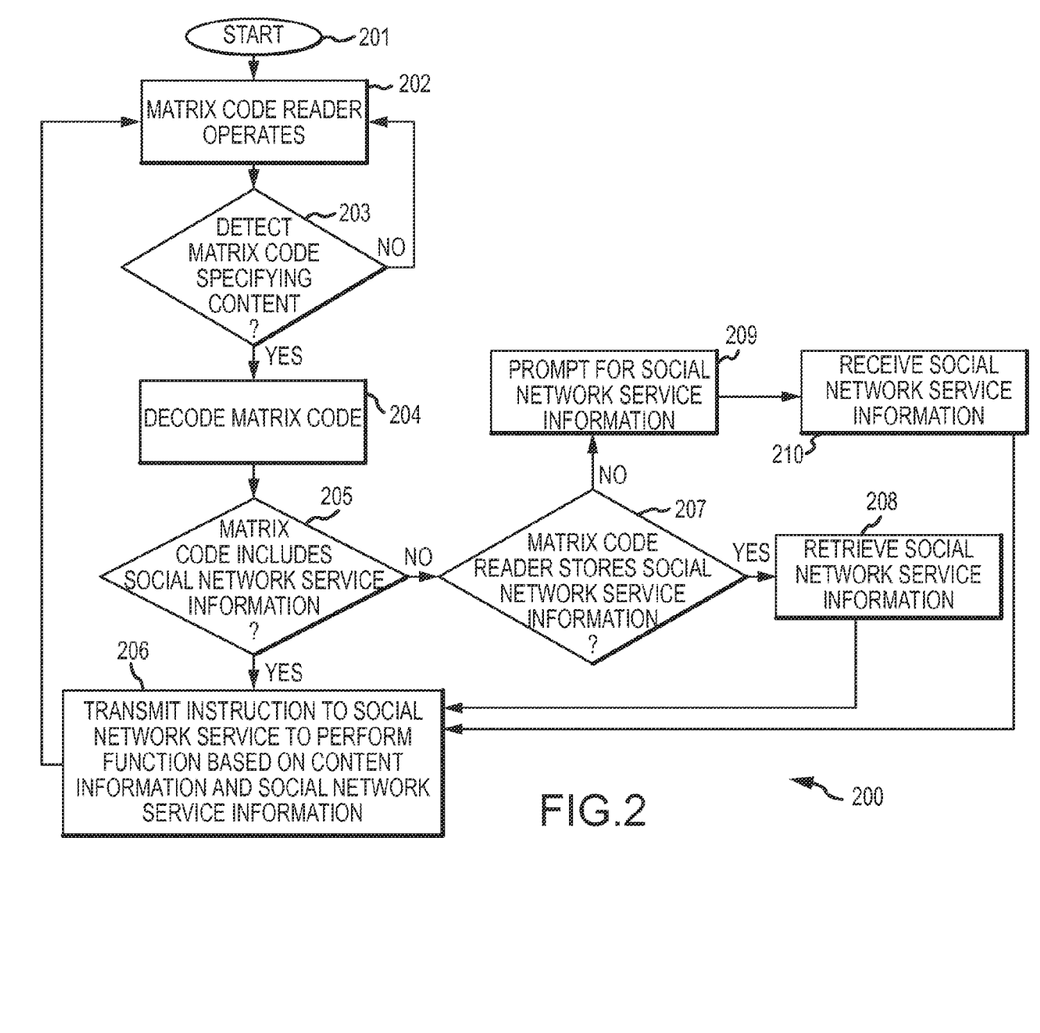
FIG. 2 is a flow chart illustrating a method for performing social networking service functions utilizing matrix codes. This method may be performed by the system of FIG. 1.

FIG. 2 illustrates a method 200 for performing social networking service functions utilizing matrix codes. The method 200 may be performed by the electronic device 101 of FIG. 1. The flow begins at block 201 and proceeds to block 202 where the matrix code reader 101 operates. The flow then proceeds to block 203 where the processing unit 106 determines whether or not the optical detector 110 detects a matrix code that includes information specifying the content with which the matrix code is included. If so, the flow proceeds to block 204. Otherwise, the flow returns to block 202 where the matrix code reader continues to operate.

At block 204, after the optical detector 110 detects a matrix code that includes information specifying the content with which the matrix code is included, the processing unit 106 decodes the matrix code. The flow then proceeds to block 205 where the processing unit determines whether or not the matrix code includes user information related to a social networking service. If not, the flow proceeds to block 207. Otherwise, the flow proceeds to block 206.

At block 206, after the processing unit 106 determines that user information related to the social networking service is included in the matrix code, the processing unit transmits an instruction to perform a social network function based on the information specifying the instance of content and the user information to the social networking service computing device 104 that is associated with the social networking service. The flow then returns to block 202 where the matrix code reader 101 continues to operate.

At block 207, after the processing unit 106 determines that user information related to the social networking service is not included in the matrix code, the processing unit determines whether the user information is stored in the non-transitory storage medium 107 of the matrix code reader 101. If so, the flow proceeds to block 208 where the processing unit retrieves the information before the flow proceeds to block 206. Otherwise, the flow proceeds to block 209.

At block 209, after the processing unit 106 determines the user information is not stored in the non-transitory storage medium 107 of the matrix code reader 101, the processing unit prompts a user for the user information via the input/output components 108 and the flow proceeds to block 210. At block 210, the processing unit receives the user information from the prompted user via the input/output components and then the flow proceeds to block 206.

Although the method 200 illustrates and describes the matrix code reader 101 decoding the matrix code and transmitting the instruction directly to the social networking service computing device 104, other contemplated arrangements are possible without departing from the scope of the present disclosure. Returning to FIG. 1, in some implementations, the system 100 may include a matrix code computing device 115 which the matrix code reader 101 may interact with via the communication component 109 to decode the matrix code, transmit instructions to the social networking service computing device 104, and so on.

In various implementations, the instance of content may be provided to the display device 102 by an electronic device 103. The electronic device may be any electronic device such as a set top box, a digital video recorder, a television tuner, a content receiver, a digital video disk player, a movie theater projection system, a home computer, and so on. The electronic device may include one or more processing units 111 which execute instructions stored in one or more non-transitory storage media 112 to provide the instance of content to the display device via the output component 113. The instance of content that is provided may be stored in the non-transitory storage medium, received from a content source 105 (such as a cable or satellite television provider, a video on demand provider, a digital video disk physical distribution network, and so on), and so on.

In some instances, the instance of content may already include the matrix code when received by the electronic device 103. In other instances, however, the electronic device may generate the matrix code, modify the matrix code, add the matrix code to the instance of content, and so on. In implementations where the electronic device generates or modifies the matrix code, the electronic device may obtain the information identifying the content, the user information, information regarding the instruction to perform the social networking function, and so on (such as from the non-transitory storage medium, via the communication component 114, from a user, and so on) and may include such information in the matrix code before adding the matrix code to the instance of content.

While the social networking computing device 104 and the associated social networking service is illustrated and described above as an independent service provider entity such as Facebook™, MySpace™, Twitter™, and so on, other contemplated arrangements are possible without departing from the scope of the present disclosure. In various implementations, the described social networking service may include software and/or hardware tools that are not part of an independent service provider entity which users set up to function as social networking services. Such tools may include as calendaring programs, mass email or text message lists, and so on. As such, in those implementations the social networking service computing device 104 may be a computing device that is configured to support the software and/or hardware tools which the user configures to function as social networking services.

Figure 3A:
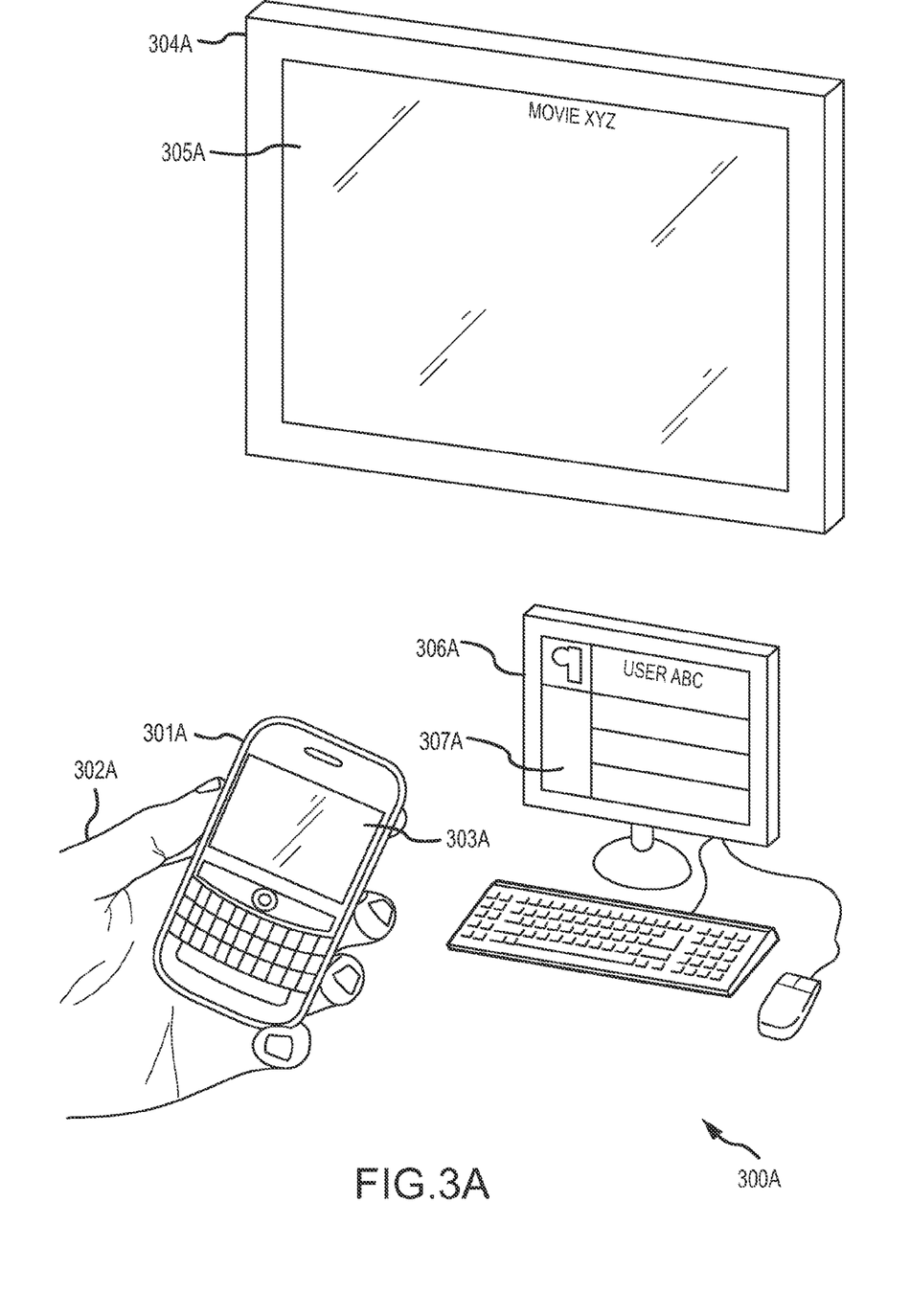
FIGS. 3A-3D are diagrams illustrating a user utilizing a system to perform social networking functions by capturing matrix codes displayed on a television. The system may be the system of FIG. 1.

FIGS. 3A-3D illustrate a user 302A-302D utilizing a system to perform social networking functions by capturing matrix codes 308B-308D displayed on a television 304A-304D. The system may be the system 100 of FIG. 1. As illustrated in FIG. 3A, the user 302A is watching Movie XYZ which is displayed on a television screen 305A of the television 304A. Also as illustrated, the user 302A has a smart phone 301A and a desktop computer 306A which is displaying a social networking service web site on a monitor screen 307A.

Figure 3B:
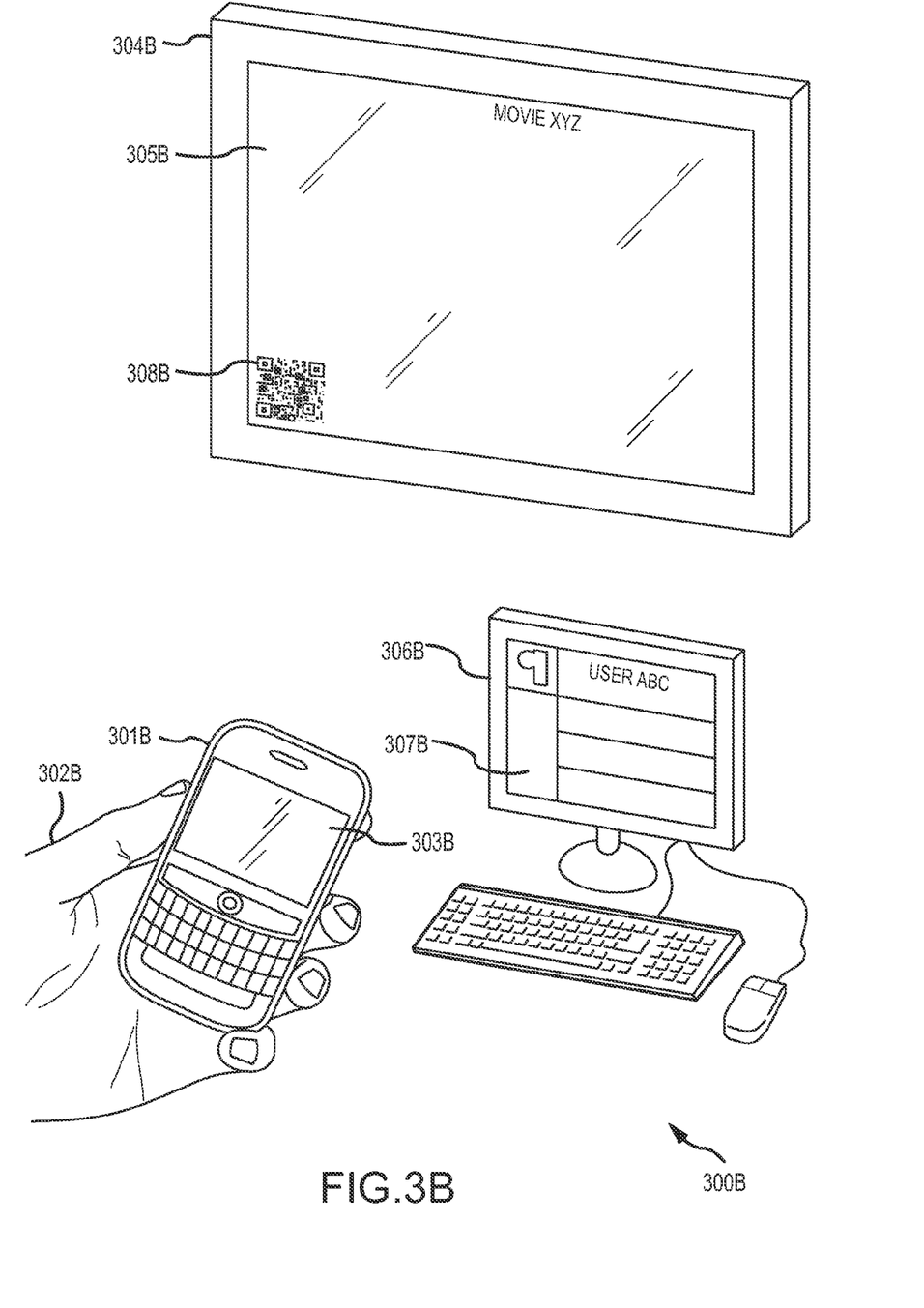

In FIG. 3B, the television 304B displays a matrix code 308B along with Movie XYZ on the television screen 305B. The matrix code 308B includes information specifying that the content displayed on the television screen 305B is Movie XYZ. Additionally, the matrix code 308B includes user information that specifies a network address for the social networking service web site displayed on the monitor screen 307B, log in information associated with the social networking service web site displayed on the monitor screen 307B for the user 302B, and an indication to post a status update on the social networking service web site displayed on the monitor screen 307B that the user 302B is watching Movie XYZ.

Figure 3C:
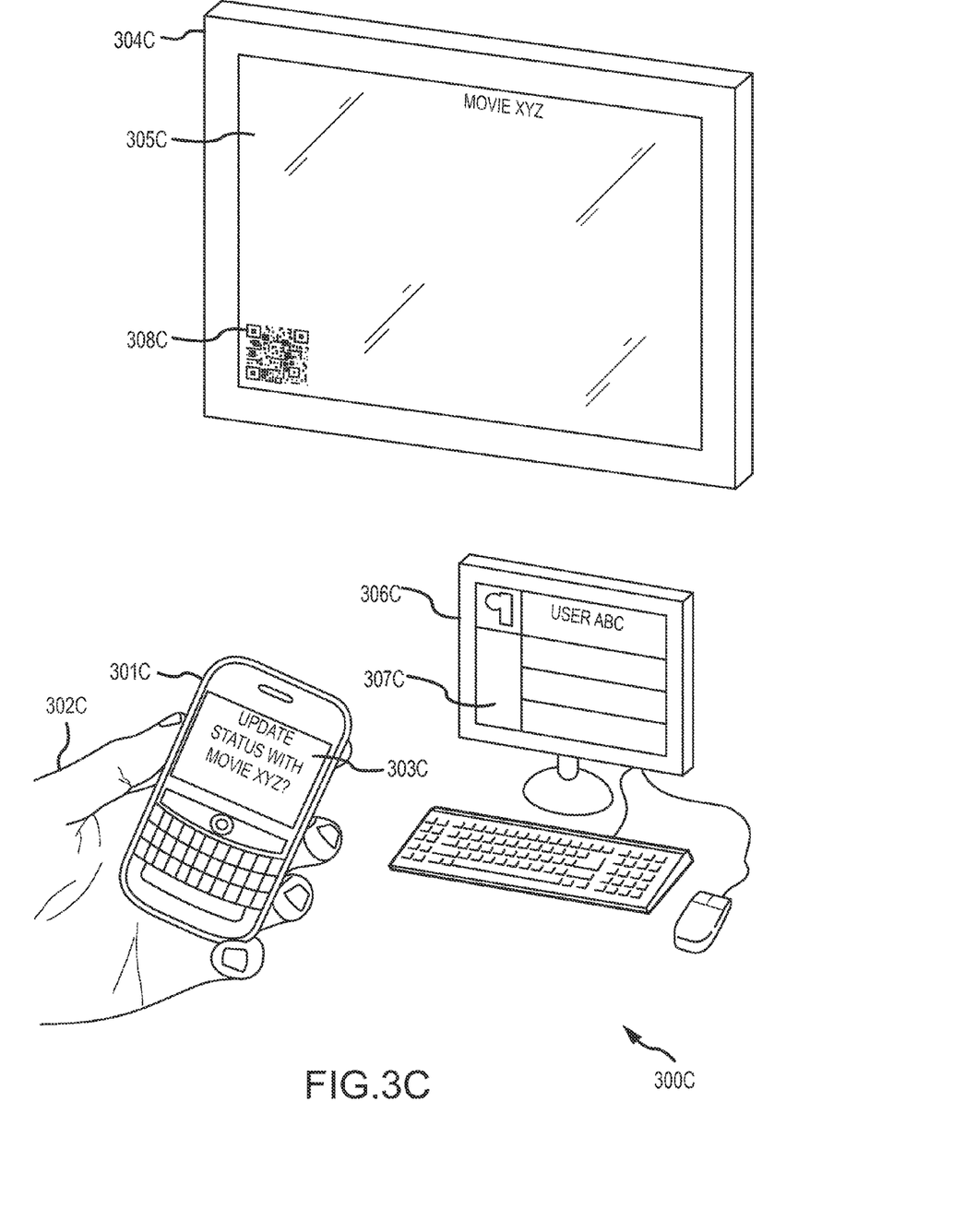

When, as depicted in FIG. 3C, the user 302C captures the matrix code 308C with the smart phone 301C, the smart phone 303C decodes the matrix code 308C to obtain the information included in the matrix code 308C. The smart phone 303C then displays a prompt on a smart phone screen 303C asking the user 302C whether or not to post an update to the social networking service web site displayed on the monitor screen 307C that the user 302C is watching Movie XYZ.

In some instances, the user 302C may not wish to share the fact that he is watching Movie XYZ with other users of the social networking service web site displayed on the monitor screen 307C. For example, Movie XYZ may constitute adult entertainment and the user 302C may not wish to alert other social networking service users that he watches adult entertainment and may respond negatively to the prompt displayed on the smart phone screen 303C utilizing input elements of the smart phone 301C.

Figure 3D:
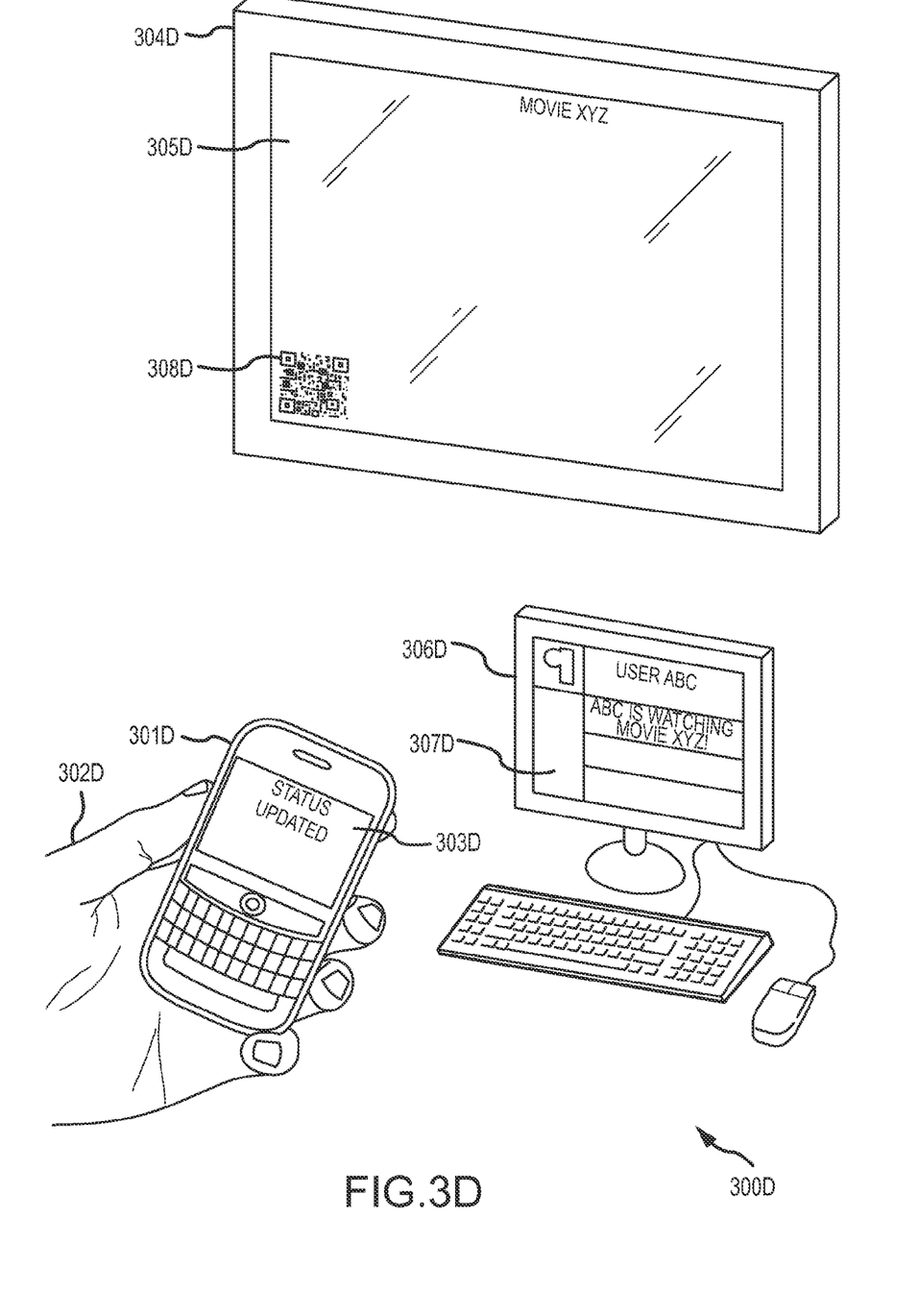

However, as illustrated in FIG. 3D, if the user 302D responds affirmatively to the displayed prompt, the smart phone 301D transmits an instruction to the social networking service web site displayed on the monitor screen 307D to post a status update that the user 302D is watching Movie XYZ. Additionally, the smart phone 301D displays a message on the smart phone screen 303D indicating that the status of the user 302D has been updated on the social networking service web site displayed on the monitor screen 307D to indicate that the user 302D is watching Movie XYZ.

Although FIGS. 3A-3D illustrate and describe that the information utilized to transmit the instruction to post the status update to the social networking service web site is obtained by the smart phone 301A-301D from the matrix code 308B-308D, it is understood that other contemplated arrangements are possible. One of more portions of such information may be obtained from a non-transitory storage medium (not shown) of the smart phone 301A-301D, from the user 302A-302D, and so on. Further, although FIGS. 3A-3D illustrate and describe that the smart phone 301A-301D decode the matrix code 308B-308D and transmit the instruction to update the status of the user 302A-302D to the social networking service web site displayed on the monitor screen 307D, it is understood that other contemplated arrangements are possible. The smart phone 301A-301D may transmit the captured matrix code 308B-308D to one or more backend servers which may decode the matrix code. The smart phone 301A-301D may also communicate with the backend servers to transmit the instruction to update the status of the user 302A-302D to the social networking service web site displayed on the monitor screen 307D.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for performing social networking service functions utilizing matrix codes, the method comprising:
   detecting, utilizing at least one matrix code reader, at least one matrix code included in at least one instance of content displayed by at least one display device, wherein the at least one matrix code includes information identifying the at least one instance of content;
   obtaining, utilizing the at least one matrix code reader, user information associated with at least one social networking service; and
   transmitting at least one instruction to perform at least one social network service function, utilizing the at least one matrix code reader, to the at least one social networking service based at least on the information identifying the at least one instance of content and the user information, wherein the at least one instruction to perform at least one social network service function comprises scheduling at least one social event associated with the at least one instance of content.

2. The method of claim 1, wherein the user information associated with the at least one social networking service is included in the at least one matrix code.

3. The method of claim 1, wherein the at least one matrix code detected by the at least one matrix code reader was included in the at least one instance of content by an electronic device prior to the electronic device transmitting the at least one instance of content to the display device.

4. The method of claim 3, wherein the user information associated with the at least one social networking service is stored by the electronic device and included in the at least one matrix code.

5. The method of claim 1, wherein the user information associated with the at least one social networking service is stored by the at least one matrix code reader.

6. The method of claim 1, wherein the at least one instruction to perform at least one social network service function is included in the at least one matrix code.

7. The method of claim 1, wherein the at least one matrix code reader selects the at least one instruction to perform at least one social network service function in response to detecting that the at least one matrix code includes the information identifying the at least one instance of content.

8. The method of claim 1, further comprising performing at least one of decoding the at least one matrix code utilizing the at least one matrix code reader or transmitting the at least one matrix code from the at least one matrix code reader to at least one matrix code decoding computing device.

9. The method of claim 1, wherein the at least one instruction to perform at least one social network service function further comprises at least one of posting at least one status update regarding the at least one instance of content, posting at least one comment regarding the at least one instance of content, posting at least one review of the at least one instance of content, or submitting a request to join a group associated with the at least one instance of content.

10. The method of claim 1, further comprising scheduling a social gathering for individuals to attend following completion of the at least one instance of content.

11. A system for performing social networking service functions utilizing matrix codes, comprising:
    at least one display device that displays at least one instance of content which includes at least one matrix code wherein the at least one matrix code includes information identifying the at least one instance of content; and
    at least one matrix code reader device, comprising:
        at least one optical detector that detects the at least one matrix code displayed with the at least one instance of content by the at least one display device;
        at least one processing unit that obtains user information associated with at least one social networking service; and
        at least one communication component;
    wherein the at least one processing unit transmits at least one instruction to perform at least one social network service function, to the at least one social networking service via the at least one communication component based at least one the information identifying the at least one instance of content and the user information, and wherein the at least one instruction to perform at least one social network service function comprises scheduling at least one social event associated with the at least one instance of content.

12. The system of claim 11, further comprising at least one electronic device comprising:
    at least one output component; and
    at least one electronic device processing unit that combines the at least one matrix code with the at least one instance of content and transmits the at least one instance of content including the at least one matrix code to the at least one display device.

13. The system of claim 12, wherein the at least one electronic device further includes at least one non-transitory storage medium that stores the user information associated with the at least one social networking service and the at least one electronic device processing unit includes the user information in the at least one matrix code.

14. The system of claim 11, wherein the at least one processing unit determines the at least one instruction by at least one of determining that the at least one matrix code includes the at least one instruction or selecting the at least one instruction in response to detecting that the at least one matrix code includes the information identifying the at least one instance of content.

15. The system of claim 11, wherein the at least one instruction to perform at least one social network service function further comprises at least one of posting at least one status update regarding the at least one instance of content, posting at least one comment regarding the at least one instance of content, posting at least one review of the at least one instance of content, or submitting a request to join a group associated with the at least one instance of content.

16. The system of claim 11, wherein the at least one processing unit decodes the at least one matrix code.

17. The system of claim 11, further comprising at least one matrix code decoding computing device wherein the at least one processing unit transmits the at least one matrix code to the least one matrix code decoding computing device via the at least one communication component and the least one matrix code decoding computing device decodes the received at least one matrix code.

18. The system of claim 11, wherein the at least one matrix code reader device further comprises at least one input/output component and the at least one processing unit:
    determines that additional information beyond the user information is required to transmit the at least one instruction;
    prompts at least one user for the additional information via the at least one input/output component; and
    receives the additional information via the at least one input/output component.

19. The system of claim 11, wherein the at least one processing unit obtains the user information associated with at least one social networking service from at least one of the at least one matrix code or a non-transitory storage medium of the at least one matrix code reader device.

20. A method for performing social networking service functions utilizing matrix codes, the method comprising:
- determining, utilizing at least one electronic device, to include at least one matrix code in at least one instance of content to transmit to at least one display device;
- including the at least one matrix code in the at least one instance of content, wherein the at least one matrix code includes information identifying the at least one instance of content and user information associated with at least one social networking service; and
- transmitting the at least one instance of content from the at least one electronic device to the at least one display device wherein, when the at least one instance of content is displayed by the at least one display device, the at least one matrix code can be detected and decoded by at least one matrix code reader such that the at least one matrix code reader transmits at least one instruction to perform at least one social network service function to the at least one social networking service based at least on the information identifying the at least one instance of content and the user information decoded from the at least one matrix code, wherein the at least one instruction to perform at least one social network service function comprises scheduling at least one social event associated with the at least one instance of content.

* * * * *